(12) United States Patent
Bai et al.

(10) Patent No.: US 7,742,705 B2
(45) Date of Patent: Jun. 22, 2010

(54) SYSTEM AND METHOD FOR CHIRPED LIGHT SOURCE

(75) Inventors: Yu Sheng Bai, Los Altos Hills, CA (US); Fei Zhu, San Jose, CA (US)

(73) Assignee: FutureWei Technologies, Inc., Plano, TX (US)

(*) Notice: Subject to any disclaimer, the term of this patent is extended or adjusted under 35 U.S.C. 154(b) by 1091 days.

(21) Appl. No.: 11/347,558

(22) Filed: Feb. 2, 2006

(65) Prior Publication Data
US 2006/0263099 A1    Nov. 23, 2006

Related U.S. Application Data

(60) Provisional application No. 60/684,011, filed on May 23, 2005.

(51) Int. Cl.
*H04B 10/04* (2006.01)
(52) U.S. Cl. .................. 398/199; 398/188; 398/201
(58) Field of Classification Search ......... 398/185–191, 398/193, 199, 201
See application file for complete search history.

(56) References Cited

U.S. PATENT DOCUMENTS

| | | | |
|---|---|---|---|
| 5,535,039 A | | 7/1996 | Belcher et al. |
| 6,552,838 B2* | | 4/2003 | Ransijn et al. ............. 359/245 |
| 2004/0109698 A1* | | 6/2004 | Kim et al. .................. 398/199 |
| 2004/0114208 A1* | | 6/2004 | Balsamo et al. ............ 359/254 |

FOREIGN PATENT DOCUMENTS

| | | |
|---|---|---|
| CN | 1394008 | 1/2003 |
| EP | 1492205 | 12/2004 |
| GB | 397388 A2 | 8/1933 |

OTHER PUBLICATIONS

Korotky et al.; "High-Speed, Low Power Optical Modulator with Adjustable Chirp Parameter", Integrated Photonics Research 1991, XP000646005.
Gnauck A H et al.; "Dispersion Penalty Reduction Using an Optical Modulator with Adjustable Chirp", IEEE Photonics Technology Letters, IEEE Service Center, Piscataway, NJ, US, vol. 3, No. 10, Oct. 1, 1991, pp. 916-918, XP000226063 ISSN: 1041-1135.

(Continued)

*Primary Examiner*—Dzung D Tran
(74) *Attorney, Agent, or Firm*—Townsend and Townsend and Crew LLP

(57) ABSTRACT

A system and method for providing chirped light for an optical network. The system includes a light source configured to provide a light. The system additionally includes a driving signal source configured to provide a first driving signal. The system also includes an amplifier configured to receive the first driving signal, amplify the first driving signal, and provide a second driving signal at a predetermined amplification level, the second driving signal being the amplified first signal. Additionally, the system includes a splitter configured to receive the second driving signal and split the second driving signal into a third driving signal and a fourth driving signal. The system also includes a first attenuator configured to receive the third driving signal, attenuate the third driving signal at a first attenuation level, and provide a fifth driving signal, the fifth driving signal being the third driving signal attenuated by the first attenuator.

22 Claims, 10 Drawing Sheets

OTHER PUBLICATIONS

Jeong Jichai et al.; "Accurate Determination of Transient Chirp Parameter in High Speed Digital Lightwave Transmitters", Electronic Letters, IEE Stevenage, GB, vol. 33, No. 7, Mar. 27, 1997, pp. 605-606, XP006007245 ISSN: 0013-5194.

Graham H Smith et al.; "Overcoming Chromatic-Dispersion Effects in Fiber-Wireless Systems Incorporating External Modulators", IEEE Transactions on Microwave Theory and Techniques, IEEE Service Center, Piscataway, NJ, US, vol. 45, No. 8, Aug. 1997, XP011036928.

Jichai Jeong et al.;"10-Gb/s Transmission Performance for Positive-and-Negative-Chirped Transmitters with the Self-Phase Modulation Effect" IEEE Photonics Technology Letters, IEEE Service Center, Piscataway, NJ, US, vol. 10, No. 9, Sep. 1998, XP011046226 ISSN: 1041-1135.

Bakhshi et al.; "Pulse Chirp Control in an Actively Modelocked Fibre Laser Using a Dual-Drive Variable—Chirp Modulator", Electronics Letters, vol. 36, No. 4, Feb. 17, 2000, XP06014836.

Yan L-S et al.; Optical Society of America/Institute of Electrical and Electronics Engineers; "Chirp Measurement of Electro-Optic Modulators Using Simple Optical Spectrum Analysis", Optical Fiber Communication Conference.(OFC). Postconference Digest Atlanta,GA, Mar. 23-28, 2003, Trends in Optics and Photonics Series,(TOPS), Washington,DC: OSA, US, vol. TOPS, vol. 86, Mar. 23, 2003, pp. 70-72, XP010680204 ISBN: 1-55752-746-6.

Communication from the European Patent Office of EP Application No. 06 741 958.0-2415, dated Apr. 14, 2008.

* cited by examiner

SYSTEM AND METHOD FOR CHIRPED LIGHT SOURCE

CROSS-REFERENCES TO RELATED APPLICATIONS

The present application claims the benefit of U.S. Provisional Patent Application No. 60/684,011, entitled: "SYSTEM AND METHOD FOR CHIRPED LIGHT SOURCE", and filed on May 23, 2005, which is incorporated herein by reference.

BACKGROUND OF THE INVENTION

The present invention relates in general to telecommunication techniques. More particularly, the invention provides a method and system for chirped light source. Merely by way of example, the invention is described as it applies to optical networks, but it should be recognized that the invention has a broader range of applicability.

In optical transmission networks, signals are generally driven by light sources. Often signals in an optical transmission network travel over hundreds or even thousands of miles. An important characteristics of optical fiber transmission is fiber nonlinearity that can cause, among other things, dispersion penalty and thus limit the transmission distance. For example, nonlinearity may create self-phase modulation (SPM) effect. To improve the tolerance for nonlinear impairment of light sources, a system for transmitting signals with spectrally enriched optical pulses may be used. For example, a Directly Modulated Lasers (DML) source may be used to produce spectrally enriched optical pulses with simultaneous amplitude and frequency modulation. Spectrally enriched optical pulses are usually more tolerant to fiber nonlinearity. For example, a DML can, among other things, generate a positive chirp to counter-balance the (SPM) effect and thus the positively chirped pulse is more tolerant to fiber nonlinearity.

FIG. 1 is a simplified diagram of a conventional system for producing spectrally enriched optical pulses. Spectrally enriched optical pulses may be in form of chirped light. For example, chirped light is frequency-modulated light. As another example, chirped light has a frequency that varies with time, the variation of frequency staying within a range. The system 100 includes a DML 110, a driving signal source 120, an RF amplifier 130, and a voltage source 140. The system 100 produces chirped light output 150. The driving signal source 120 provides driving signals to the RF amplifier 130. Driving signals produced by the driving signal source 120 may be an NRZ binary signal associated with a predetermined minimum pulse duration. Alternatively, driving signals may be alternating current (AC) or clock signals. After the RF amplifier 130 receives driving signals from the driving signal source 120, the RF amplifier 130 amplifies the driving signals with a predetermined amplification factor. After amplification, the RF amplifier 130 transmits the driving signals to the DML 110. The DML 110 first couples the amplified driving signals with a bias voltage supplied by the voltage source 140. As an example, a bias voltage is a direct current (DC) voltage. Then the amplified driving signals modulate the DML 110. As an example, the DML output 150 is an optical signal that has been modulated in amplitude. Sometimes, the optical signal is also frequency-modulated.

Generally, the wavelength of DML sources may be tuned. One of the methods for tuning is varying the device temperature. However the spectral tuning range is often limited to about 3 nm, which covers at most 3 optical channels in case of 100 GHz dense wavelength division multiplexing (DWDM) channel spacing. A modern DWDM optical transport system often needs to use several tens of channels. The narrow spectral tuning range of conventional DML sources could mean that more than 10 DMLs are needed to cover typical operating spectral range of greater than 30 nm in a DWDM optical system. Utilizing multiple, often in an order of tens, of DMLs leads to high inventory cost and limits the flexibility in applications where dynamical wavelength provisioning is required.

Hence it is highly desirable to improve techniques for generating chirped light source that offers both wide spectral tunable range in wavelength and substantially the same chirp characteristics of the conventional DMLs.

BRIEF SUMMARY OF THE INVENTION

The present invention relates in general to telecommunication techniques. More particularly, the invention provides a method and system for chirped light source. Merely by way of example, the invention is described as it applies to optical networks, but it should be recognized that the invention has a broader range of applicability.

An embodiment of the invention provides a system for providing chirped light for an optical network. The system includes a light source. The light source is configured to provide a light. The system additionally includes a driving signal source, which is configured to provide a first driving signal. The system also includes an amplifier. The amplifier is configured to receive the first driving signal, amplify the first driving signal, and provide a second driving signal at a predetermined amplification level, the second driving signal being the amplified first signal. Additionally, the system includes a splitter configured to receive the second driving signal and split the second driving signal into a third driving signal and a fourth driving signal. The system also includes a first attenuator configured to receive the third driving signal, attenuate the third driving signal at a first attenuation level, and provide a fifth driving signal, the fifth driving signal being the third driving signal attenuated by the first attenuator. In addition, the system includes a second attenuator configured to receive the fourth driving signal, attenuate the fourth driving signal at a second attenuation level, and provide a sixth driving signal, the sixth driving signal being the fourth driving signal attenuated by the second attenuator. The fifth driving signal is different from the sixth driving signal. The second attenuation level is different from the first attenuation level. The system additionally includes a voltage source configured to provide a first bias voltage and a second bias voltage. Additionally, the system includes a modulator configured to receive the light, modulate the light using a first applied voltage and a second applied voltage, and provide a chirped light output. The first applied voltage includes the fifth driving signal and the first bias voltage. The second applied voltage includes the sixth driving signal and the second bias voltage.

According to another embodiment of the present invention, a system for providing chirped light for optical network includes a light source configured to provide a light. Additionally, the system includes a driving signal source configured to provide a first driving signal. The system also includes a splitter configured to receive the first driving signal and split the first driving signal into a second driving signal and a third driving signal. Moreover, the system includes a first amplifier configured to receive the second driving signal, amplify the second driving signal, and provide a fourth driving signal at a first amplification level, the fourth driving signal being the amplified first signal. The system additionally includes a second amplifier configured to receive the third driving signal, amplify the third driving signal, and provide a fifth driving signal at a second amplification level, fifth third driving signal being the amplified first second. The fourth driving signal is different from the fifth driving signal. The first amplification level is different from the second amplification level. In addition, the system includes a voltage source configured to provide a first bias voltage and a second bias voltage. The system also includes a modulator configured to receive the light, modulate the light using a first applied voltage and a second applied voltage, and provide a chirped light output. The first applied voltage includes the fourth driving signal and the first bias voltage. The second applied voltage includes the fifth driving signal and the second bias voltage.

According to yet another embodiment of the present invention, a system for providing chirped light for an optical network includes a light source configured to provide a light. The system additionally includes a driving signal source configured to provide a first driving signal. Moreover, the system includes an amplifier configured to receive the first driving signal, amplify the first driving signal, and provide a second driving signal at a predetermined amplification level, the second driving signal being the amplified first signal. In addition, the system includes a splitter configured to receive the second driving signal and split the second driving signal into a third driving signal and a fourth driving signal. Additionally, the system includes an attenuator configured to receive the third driving signal, attenuate the third driving signal at a first attenuation level, and provide a fifth driving signal, the fifth driving signal being the third driving signal attenuated by the first attenuator. The system also includes a voltage source configured to provide a first bias voltage and a second bias voltage. Additionally, the system includes a modulator configured to receive the light, modulate the light using a first applied voltage and a second applied voltage, and provide a chirped light output. The first applied voltage includes the fifth driving signal and the first bias voltage. The second applied voltage includes the fourth driving signal and the second bias voltage.

According to yet another embodiment of the present invention, a method for providing chirped light for an optical network includes providing a light, providing a first driving signal, amplifying the first driving signal at a predetermined amplification level, splitting the amplified first driving signal into a second driving signal and a third driving signal, attenuating the second driving signal at a first attenuation level, and attenuating the third driving signal at a second attenuation level. The first attenuation level is different from the second attenuation level. The attenuated second signal is different from the attenuated third signal. Additionally, the method includes coupling the attenuated second driving signal to a first bias voltage to generate a first applied voltage and coupling the attenuated third driving signal to a second bias voltage to generate a second applied voltage. In addition, the method includes modulating the light using the first applied voltage and the second applied voltage. The method also includes providing a chirped light output, the chirped light output being associated with the modulated light.

According to yet another embodiment of the present invention, a method for providing chirped light for an optical network includes providing a light and providing a first driving signal. The method additionally includes amplifying the first driving signal at a predetermined amplification level and splitting the amplified first driving signal into a second driving signal and a third driving signal. In addition, the method includes attenuating the second driving signal at a predetermined attenuation level. The method also includes coupling the attenuated second driving signal to a first bias voltage to generate a first applied voltage, and coupling the third driving signal to a second bias voltage to generate a second applied voltage. In addition, the method includes modulating the light using the first applied voltage and the second applied voltage. Moreover, the method includes providing a chirped light output, the chirped light output being associated with the modulated light.

According to yet another embodiment of the present invention, a method for providing chirped light for an optical network includes providing a light and providing a first driving signal. Additionally, the method includes splitting the amplified first driving signal into a second driving signal and a third driving signal, amplifying the second driving signal at a first amplification level, and amplifying the third driving signal at a second amplification level. The first amplification level is different from the second amplification level. The method additionally includes coupling the amplified second driving signal to a first bias voltage to generate a first applied voltage, and coupling the amplified third driving signal to a second bias voltage to generate a second applied voltage. Moreover, the method includes modulating the light using the first applied voltage and the second applied voltage. The method also includes providing a chirped light output, the chirped light output being associated with the modulated light.

According to yet another embodiment, the present invention provides a system for providing chirped light for an optical network. The system includes a light source configured to provide a light. Additionally, the system includes a driving signal source configured to provide a first driving signal. Moreover, the system includes an amplifier configured to receive the first driving signal, amplify the first driving signal, and provide a second driving signal at a predetermined amplification level. The second driving signal is the amplified first signal. The system also includes a splitter configured to receive the second driving signal and split the second driving signal into a third driving signal and a fourth driving signal. The system additionally includes a voltage source configured to provide a first bias voltage and a second bias voltage. In addition, the system includes a modulator configured to receive the light, modulate the light using a first applied voltage and a second applied voltage, and provide a chirped light output. The third driving signal and the fourth driving signal are different and have a predetermined magnitude ratio. The first applied voltage includes the third driving signal and the first bias voltage. The second applied voltage includes the fourth driving signal and the second bias voltage.

According to yet another embodiment, the present invention provides a method for providing chirped light for an optical network. The method includes the step of providing a light. The method also includes the step of providing a first driving signal. Additionally, the method includes the step of amplifying the first driving signal at a predetermined amplification level. In addition, the method includes splitting the amplified first driving signal into a second driving signal and a third driving signal. The second driving signal and the third driving signal are different and share a predetermined magnitude ratio. The method additionally includes the step of coupling the second driving signal to a first bias voltage to generate a first applied voltage. Moreover, the method includes the step of coupling the third driving signal to a second bias voltage to generate a second applied voltage. Additionally, the method includes the step of modulating the light using the first applied voltage and the second applied voltage. The method also includes providing a chirped light output. The chirped light output is associated with the modulated light.

Many benefits are achieved by way of the present invention over conventional techniques. For example, according to certain embodiments of the present invention, a much wider spectral range is obtained. For example, using a widely tunable CW laser as light source, an emulated directly modulated lasers (eDML) system according the present invention may have a spectral range wider than 30 nm. Distributed feedback (DFB) lasers are one type of CW lasers that is often used. Additionally, some embodiments of the present invention can make certain applications, such as DWDM applications, more cost effective than using a conventional DML system. For example, an exemplary eDML system, utilizing integrated InP MZ modulator with DFB lasers, may replace a DML system in some transponders. Because the integrated InP MZ modulator with DFB lasers are equipped with internal wavelength lockers, the eDML system can be highly cost-effective implementation of transponders for DWDM applications at channel spacing of 50 GHz or less.

Depending upon embodiment, one or more of these benefits may be achieved. These benefits and various additional objects, features and advantages of the present invention can be fully appreciated with reference to the detailed description and accompanying drawings that follow.

BRIEF DESCRIPTION OF THE DRAWINGS

The features, objects, and advantages of embodiments of the disclosure will become more apparent from the detailed description set forth below when taken in conjunction with the drawings.

DETAILED DESCRIPTION OF THE INVENTION

The present invention relates in general to telecommunication techniques. More particularly, the invention provides a method and system for a chirped light source. Merely by way of example, the invention is described as it applies to optical networks, but it should be recognized that the invention has a broader range of applicability.

Figure 1:
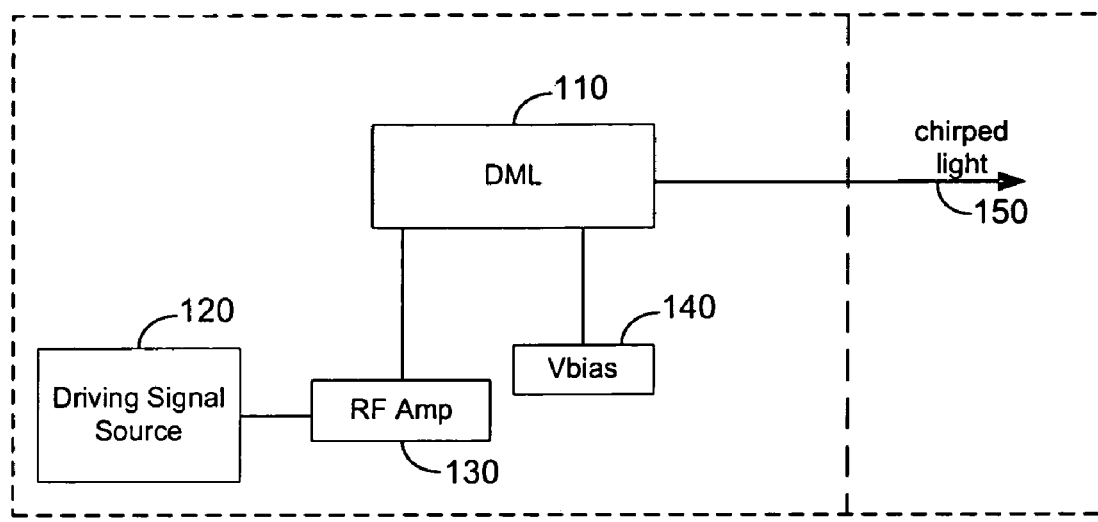
FIG. 1 is a simplified diagram of a conventional DML system that produces a chirped light source.

Referring to FIG. 1, the chirp, e.g., instantaneous frequency deviation, of the chirped light 150 from the DML 110 when subjected to the modulation by the driving signal may be characterized with a frequency v. amplitude relationship as the following.

$$\Delta v_{CHIRP}(t) = \alpha/4\pi \cdot d(ln\ [I(t)])/dt \qquad \text{(Equation 1)}$$

In Equation 1, the chirp factor $\alpha$ describes the frequency modulation, which may be expressed in form of a derivative of phase modulation, as the following.

$$\alpha = 2 \cdot (d\phi/dt)/[1/I(t) \cdot dI(t)/dt] \qquad \text{(Equation 2)}$$

Merely by way of an example, in a pure phase modulation, which may be produced by a stripe waveguide modulator, the chirp factor $\alpha$ is infinity. In another example, in a pure amplitude modulation, which may be produced by an ideal push-pull Mach Zehnder (MZ) modulator, the chirp factor $\alpha$ is zero.

In a DML modulation, the chirp factor $\alpha$ is generally a real number with a positive value. When the DML 110 is under the modulation of driving signals, changes in both real and imaginary part of the refractive index of active layer materials cause both frequency and amplitude modulation. Merely by way of an example, active layer materials may be based on AlGaAs or InGaAsP. For both AlGaAs and InGaAsP based DML modulation, the chirp factor $\alpha$ typically has a positive numerical value that ranges from two to five.

Under the modulation of driving signals at a proper biasing voltage, the DML 110 provides a chirped light output 150. Merely by way of an example, a chirped light output may be illustrated by the waveform shown in FIG. 2 and the output spectra shown in FIGS. 3a and 3b.

Figure 2:
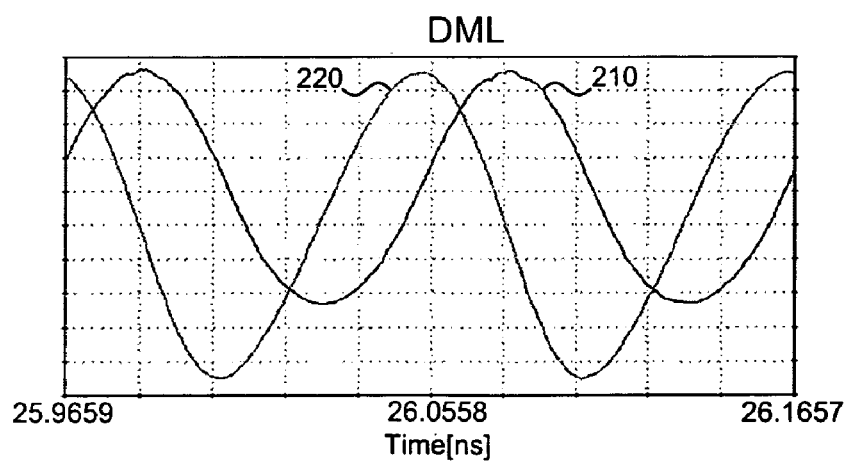
FIG. 2 illustrates an example of a conventional chirped light waveform produced by a conventional DML system.

FIG. 2 illustrates an example of a conventional chirped light waveform produced by a conventional DML system. As an example, the chirped light waveform may be produced by the system 100 in FIG. 1. In this example, the driving signal source 120 of FIG. 1 provides a sinusoidal signal at 9.95 GHz to the RF amplifier 130. The RF amplifier 130 amplifies the sinusoidal signal to a peak-to-peak voltage of 2.5V. Under the modulation of the sinusoidal signal, the DML 110 produces a chirped light output 150. The chirped light output 150 is characterized by a chirp profile 220 and an intensity profile 210 as shown in FIG. 2.

Figure 3A:
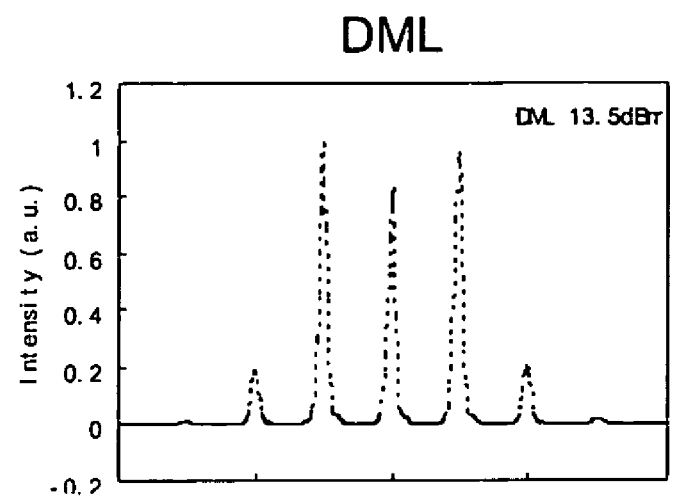
FIG. 3a illustrates an example of a conventional chirped light output spectrum produced by a conventional DML system.

FIG. 3a illustrates an example of a conventional chirped light output spectrum produced by a conventional DML system. As an example, the chirped light waveform may be produced by the DML system 100 in FIG. 1. In this example, the driving signal source 120 of FIG. 1 provides a sinusoidal signal at 9.95 GHz to the RF amplifier 130. The RF amplifier 130 amplifies the sinusoidal driving signals to a driving power of 13.5 dBm. Under the modulation of the sinusoidal signal, the DML 110 produces a chirped light output 150. The chirped light output 150 exhibits the chirped light output frequency spectrum as shown on FIG. 3a.

Figure 3B:
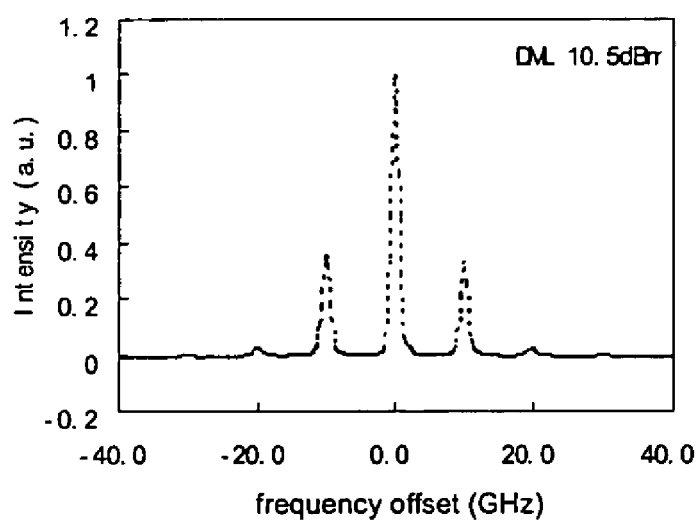
FIG. 3b illustrates an example of a conventional chirped light output spectra produced by a conventional DML system.

FIG. 3b illustrates an example of a conventional chirped light output spectrum produced by a conventional DML system. As an example, the chirped light waveform may be produced by the DML system 100 in FIG. 1. In this example, the driving signal source 120 of FIG. 1 provides a sinusoidal signal at 9.95 GHz to the RF amplifier 130. The RF amplifier 130 amplifies the sinusoidal driving signals to a driving power of 10.5 dBm. Under the modulation of the sinusoidal signal, the DML 110 produces a chirped light output 150. The chirped light output 150 exhibits the chirped light output frequency spectrum as shown on FIG. 3*b*.

Generally, transponders based on a conventional DML system often work only with fixed wavelengths. The spectral tuning range in such conventional DML systems is often limited to less than 3 nm. For reducing the equipment sparing cost in long haul (LH) or ultra long haul (ULH) dense wavelength division multiplexing (DWDM) transport systems, it is often desirable to have a transponder that have widely tunable wavelength.

Figure 4A:
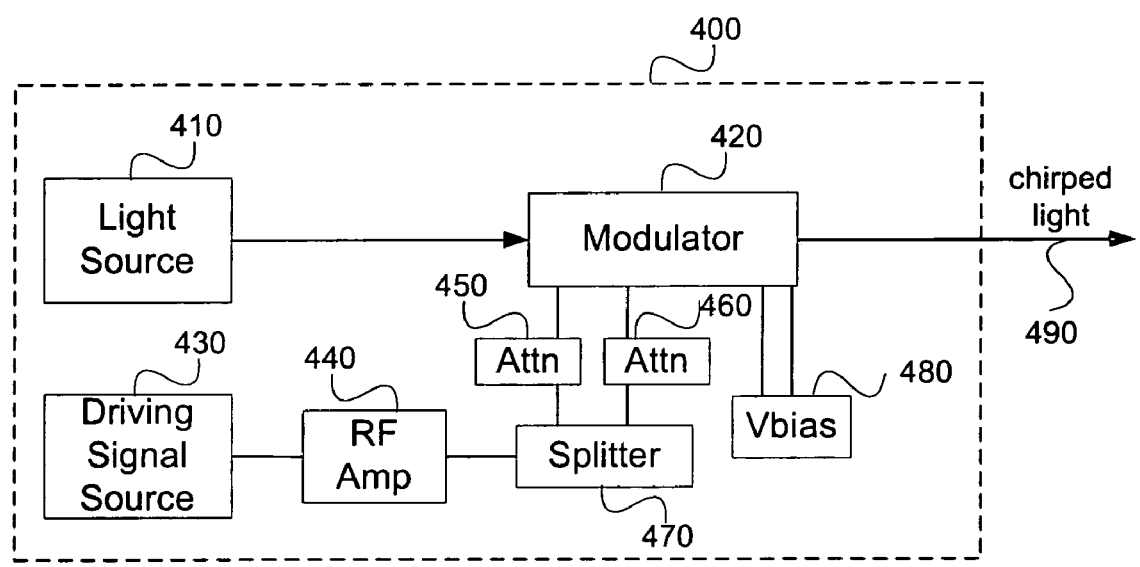
FIG. 4a is a simplified diagram illustrating an exemplary embodiment of the present invention for an emulated directly modulated lasers (eDML) system for producing chirped light.

FIG. 4*a* is a simplified diagram illustrating an exemplary embodiment of the present invention for an emulated directly modulated lasers (eDML) system for producing chirped light. This diagram is merely an example, which should not unduly limit the scope of the claims. One of ordinary skill in the art would recognize many variations, alternatives, and modifications. The eDML system 400 includes a light source 410, a modulator 420, a driving signal source 430, an RF amplifier 440, a first attenuator 450, a second attenuator 460, a splitter 470, and a voltage source 480. Although the above has been shown using a selected group of components for the eDML system 400, there can be many alternatives, modifications, and variations. For example, some of the components may be expanded and/or combined. Other components may be inserted to those noted above. Depending upon the embodiment, the arrangement of components may be interchanged with others replaced. The eDML system 400 is capable of producing chirped light output 490 that, for example, may be used to transmit signals over an optical network. Further details of these apparatuses are found throughout the present specification and more particularly below.

As an example, the light source 410 is continuous wave (CW) laser. It is to be appreciated that the CW laser as utilized in the present embodiment of the invention has a wide range of tunable wavelengths, which could have a tunable range greater than 30 nm. Merely by way of an example, the modulator 420 receives light from the light source 410, amplified and attenuated driving signals originated from the driving signal source 430, and two bias voltages from the voltage source 480. Generally, two bias voltages are different. As an example, two bias voltages have the same magnitude, but are opposite in their signs (one being positive, the other being negative). As another example, one of bias voltage is biased at a non-zero DC voltage, and the other bias voltage is biased at zero voltage (or ground). After modulating light with driving signals and the bias voltage, the modulator 420 transmits the chirped light output 490.

To provide light for the modulator 420, the light source 410 is used. As an example, a CW laser is used to provide laser light for the modulator 420. The voltage source 480 is electrically coupled to the modulator 420 to provide a bias voltage. Merely by way of an example, the voltage source 480 is a DC source that provides a constant DC voltage. According to an embodiment, the voltage source is a direct current source that provides two different constant DC voltages. According to an alternative embodiment, the voltage source 480 is a DC source that provides two constant DC voltages that have the same magnitude but have opposite signs. Driving signals are provided by the driving signal source 430. Merely by way of an example, driving signals produced by the driving signal source 430 is sinusoidal signals with substantially the same frequency. The driving signal source 430 provides driving signals to the RF amplifier 440. The RF amplifier 440 amplifies driving signals to a predetermined amplitude. After amplification, the RF amplifier 440 provides driving signals to the splitter 470, which splits driving signals into a first driving signal and a second driving signal. Merely by of an example, the first driving signal and a second driving signal share substantially the same properties, i.e., the first driving signal and the second driving signal have equal intensity, frequency, and phase. Next, the first attenuator 450 receives and attenuates the first driving signal, and the second attenuator 460 receives and attenuates the second driving signal. For example, the first attenuator 450 has different attenuation factor from the second attenuator 460. As a result, the first attenuator 450 modifies the first driving signal into a third driving signal, and the second attenuator 460 modifies the second driving signal into a fourth driving signal, the third driving signal and the fourth driving signal being different. The third driving signal and the fourth driving signal are both provided to the modulator 420 that uses the third driving signal and the fourth driving signal to modulate the light produced by the light source 410. A diagram for an example of modulator 420 is shown on FIG. 4*b*.

Figure 4B:
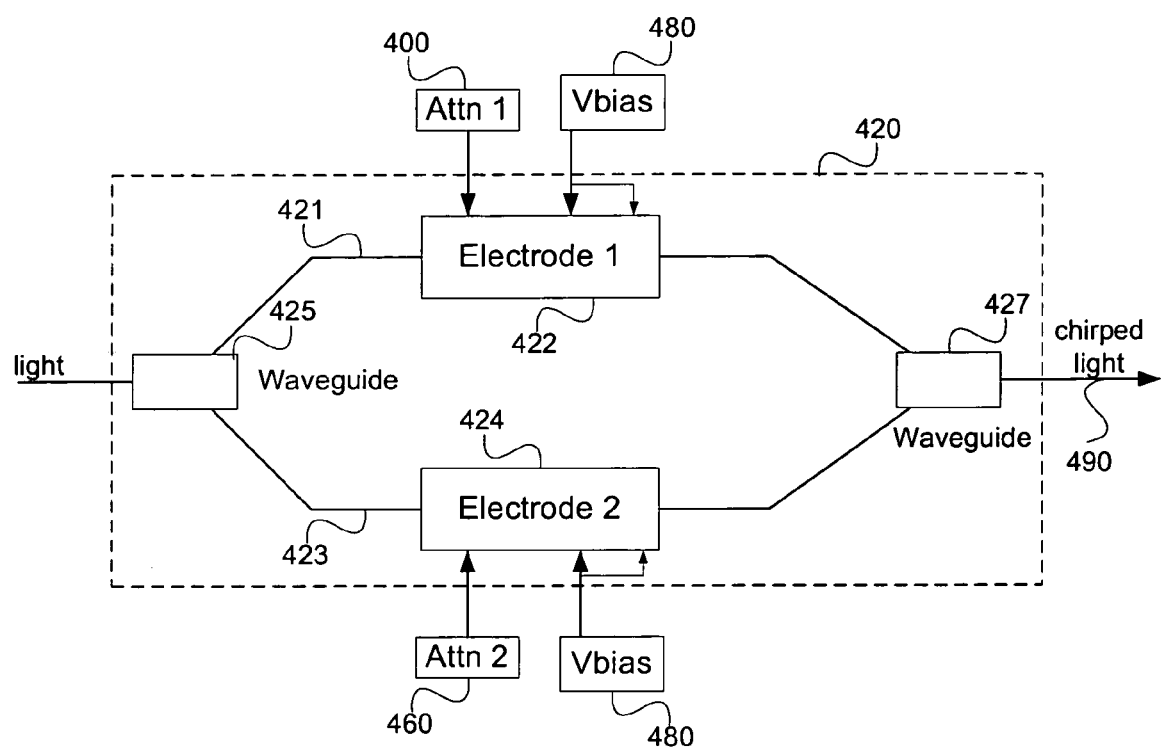
FIG. 4b is a simplified diagram for a modulator being used in an eDML system to produce chirped light output according to an embodiment of the present invention

FIG. 4*b* is a simplified diagram for a modulator being used in an eDML system to produce chirped light output according to an embodiment of the present invention. This diagram is merely an example, which should not unduly limit the scope of the claims. One of ordinary skill in the art would recognize many variations, alternatives, and modifications. As an example, the modulator 420 works in a manner similar to that of a Mach-Zehnder (MZ) modulator. The modulator 420 includes a light separator 425, a light combiner 427, a first path 421, a second path 423, a first electrode 422, and a second electrode 424.

The modulation process begins with the modulator 420 receives the light from the light source 410. The received light is separated into a first light portion and a second light portion. For example, the first light portion and the second light portion have substantially equal strength. In another example, the first light portion and the second light portion have different strength. After separation, the first light portion passes through the first path 421 and the second light portion passes through the second path 423. When the first light portion and the second light portion respectively pass through the first path 421 and the second path 423, both the first light portion and the second portion experience electrical optical effect, which causes changes in light properties associated with the first and the second light portions. When the first light portion and the second light portion are combined at the light combiner 427, the interference of the two light portions occurs.

The first electrode 422 is coupled to the first path 421. The second electrode 424 is coupled to the second path 423. As an example, an electrode may be coupled to a path by being coated along the path. The coupling of electrodes to paths generally allows for, among other things, electrical voltages to be applied to paths. When electrical voltage is applied to a path via electrodes, the light that travels through the path is affected by electro-optical (EO) effect.

For example, each electrode receives applied voltages with two components: the first of the two components is a bias component, the second of the two components is a signal component. In one embodiment, the bias component is a DC bias component, and the signal component is an alternating current (AC) component. As shown in FIGS. 4(*a*) and (*b*), the bias voltage component, as in the present embodiment of the invention, is provided by the voltage source 480. The signal component is originated from the driving signal source 430. The first electrode 422 is electrically coupled to the first attenuator 450 and the voltage source 480. From the first attenuator 450, the first electrode 422 receives the third driving signals. As previously explained, the third driving signal is provided by the driving signal source 430, amplified by the RF amplifier 440, and attenuated by the first attenuator 450. As a result of the applied voltage, which comprises the bias voltage component and the driving signal component, on the first electrode 422, the first light portion that passes through the first path 421 is modulated and becomes a third light portion with modulated optical intensity. Similarly, the second electrode 424 is electrically coupled to the second attenuator 460 and the voltage source 480. From the second attenuator 460, the second electrode receives the fourth driving signal. The fourth driving signal is provided by the driving signal source 430, amplified by the RF amplifier 440, and attenuated by the second attenuator 460. As a result of the applied voltage, which comprises the bias voltage component and the driving signal component, on the second electrode 424, the second light portion that passes through the second path 423 is modulated and becomes a fourth light portion with modulated optical intensity. The third light portion and the forth light portion are then combined at the light combiner 427 to produce a chirped light output 490.

According to an embodiment of the present invention, the electrical field of the chirped light output 490 is mathematically described as the following.

$$E_{OUT}(t)=E_{IN}/2 \cdot \{\exp[-\eta_1 \cdot D1(t)-i \cdot \phi_{diff}]+\exp[-i \cdot \eta_2 \cdot D2(t)+i \cdot \phi_{diff}]\} \quad \text{(Equation 3)}$$

It is to be noted that term "$E_{IN}/2$" in Equation 3 is used because the light from the light source 410, expressed by $E_{IN}$, is separated by the light separator 425 into two light portions that have substantially equal strength. According to an alternative embodiment, a different equation is used to describe a scenario when the light source 410 is separated into light portions that have different strength.

According to Equation 3, the terms D1(t) and D2(t) are used to express the signals applied to the electrodes as a function of time. According to the present embodiment of the invention, D1(t) expresses the third driving signal and D2(t) expresses the fourth driving signal. The driving signal from the driving signal source 430 may be expressed by the term u(t). The term u(t) is a unit function describing the temporal behavior of the driving signal electrical field. As an example, the term u(t) may simply be described by a sinusoidal function. When the driving signal u(t) is attenuated by the first attenuator 450 with an attenuation factor A1, the driving signal u(t) becomes the third driving signal D1(t). The relationship between the driving signal u(t) and the third driving signal may be expressed as D1(t)=A1·u(t). Similarly, when the driving signal u(t) is attenuated by the second attenuator 460 with an attenuation factor A2, the driving signal u(t) becomes the fourth driving signal D2(t). The relationship between the driving signal u(t) and the third driving signal may be expressed as D2(t)=A2·u(t).

The terms $\eta_1$ and $\eta_2$ are EO coefficients characterizing electrodes' effect, which is related to both EO coefficients and lengths of the electrodes 422 and 424 respectively. The term "$\phi_{diff}$" is used to express the phase shift factor. Generally the phase shift factor is associated with, inter alia, inherent path differences and applied bias voltages on the electrodes.

As an example, the first electrode 422 and the second electrode 424 may have substantially the same characteristics. It should be noted that electrodes with significantly different electrodes characteristics may be used. According to the present assumption that first electrode 422 and the second electrode 424 have substantially the same electrode characteristics, Equation 3 may be expressed as the following.

$$E_{OUT}(t)=E_{IN} \cdot \cos\{\eta/2 \cdot [D1(t)-D2(t)]+\phi_{diff}\} \cdot \exp\{-i \cdot \eta/2 \cdot [D1(t)+D2(t)]\} \quad \text{(Equation 4)}$$

The signals D1(t) and D2(t) may be varied to obtain achieve different chirped light outputs. For example, by keeping signals D1(t) and D2(t) in phase but at different amplitude, both amplitude and phase modulation can be achieved at the output. As previously noted, signals D1(t) and D2(t) can be expressed in terms of the driving signal u(t) and attenuation factors A1 and A2. The third driving signal may be expressed as D1(t)=A1·u(t). The fourth driving signal may be expressed as D2(t)=A2·u(t). In a case where A1 is great than A2, according to an embodiment of the present invention Equation 4 may be rewritten as the following.

$$E_{OUT}(t)=E_{IN} \cdot \cos\{\eta/2 \cdot (A1-A2) \cdot u(t)+\phi_{diff}\} \cdot \exp\{-i \cdot \eta/2 \cdot (A1+A2) \cdot u(t)\} \quad \text{(Equation 5a)}$$

As can be seen from Equation from 5a, the chirped light output $E_{OUT}$ has both amplitude and phase modulation derived from the differences between the third driving signal and the fourth driving signal. According to the present embodiment of the invention, the light at the input is modulated by two factors. The first factor is an amplitude modulation factor, which is proportional to the difference between the third and fourth driving signal, and this difference may be expressed as (A1−A2). The second factor is a phase modulation factor, which is proportional to the sum of the third and fourth driving signal, and this sum may be described as (A1+A2).

According to an embodiment, the intensity of the chirped light output 490 may then be described as the following.

$$I_{OUT}(t)=I_{IN} \cdot \cos^2\{\eta/2 \cdot (A1-A2) \cdot u(t)+\phi_{diff}\} \quad \text{(Equation 5b)}$$

According to an embodiment, the phase of the chirped light output 490 may be expressed as the following.

$$\phi=-\eta/2 \cdot (A1+A2) \cdot u(t) \quad \text{(Equation 5c)}$$

According to an embodiment, the instantaneous frequency deviation of the chirped light output 490 may be expressed as the following.

$$\Delta v_{CHIRP}(t)=1/2\pi d\phi/dt=-\eta/4\pi \cdot (A1+A2) \cdot d[u(t)]/dt \quad \text{(Equation 5d)}$$

According to an embodiment, the relative intensity modulation may be expressed as the following.

$$1/I(t) \cdot dI(t)/dt=-\eta \cdot (A1-A2) \cdot d[u(t)]/dt \cdot \tan\{\eta/2 \cdot (A1-A2) \cdot u(t)+\phi_{diff}\} \quad \text{(Equation 5e)}$$

According to an embodiment, the chirped factor of the chirped light output 490 may be expressed as the following.

$$\alpha=(A1+A2)/(A1-A2) \cdot \cotan\{\eta/2 \cdot (A1-A2) \cdot u(t)+\phi_{diff}\} \quad \text{(Equation 5f)}$$

Merely by way of an example, in a small signal modulation scheme, the $\eta/2 \cdot (A1-A2) \cdot u(t) \ll 1$, and the Equation 5f may be simplified as the following.

$$\alpha=(1+A2/A1)/(1-A2/A1) \cdot \cotan(\phi_{diff}) \quad \text{(Equation 5g)}$$

As it can be seen from Equation 5g, at a small signal modulation scheme, the chirp factor α depends only on the ratio between A1 and A2 according to an embodiment of the present invention. For example, the actual magnitudes of A1 and A2 do not affect the chirp factor α. Instead, the magnitudes of A1 and A2 affect the frequency chirp $\Delta v_{CHIRP}$ of the chirped light output 490.

In the present embodiment of the invention, it is often desirable for the modulator 420 to be biased at quadrature. When the modulator 420 is biased at quadrature, the phase shift factor "$\phi_{diff}$" is equal to either $\pi/4$ or $-\pi/4$. As an example, when "$\phi_{diff}$" is equally to $\pi/4$, Equation 5g may be simplified to the following expression.

$$\alpha = -[1+(A2/A1)]/[1-(A2/A1)] \quad \text{(Equation 6a)}$$

As another example, when "$\phi_{diff}$" is equally to $-\pi/4$, Equation 5g may be simplified to the following expression.

$$\alpha = -[1+(A2/A1)]/[1-(A2/A1)] \quad \text{(Equation 6b)}$$

According to Equation 6a and Equation 6b that at quadrature, the chirp factor $\alpha$ of the chirped light output 490 is solely derived from the amplitude ratio between the third driving signal and the fourth driving signal in one embodiment. For example, the amplitude ratio is determined by the attenuation factors of the first attenuator 450 and the second attenuator 460. For example, if the first attenuator 450 has an attenuation factor A1 being equal to 5, and the second attention attenuator 460 has an attenuation factor A2 being equal to 3, then the ratio of A2/A1 is equal to 0.6. When the modulator is biased at quadrature with $\phi_{diff}=\pi/4$, the chirp factor $\alpha$, according to Equation 6b, has a numerical value of 4. Other parts being equal, the chirped light output 490 produced by the eDML with a chirped factor valued at $\alpha=4$ is substantially the same as the chirped light output produced by the DML 110 with a chirped factor valued at $\alpha=4$. According to an embodiment, the chirp factor of an eDML system has a range of value between 2 to 5, which is similar to the chirp factor of a DML system. For example, one of the reasons for the chirp factor to be within the 2 to 5 range is that typical semiconductor diode lasers have chirp factors in that range. As another example, the following equation may be used.

$$A2/A1=(\alpha-1)/(\alpha+1) \quad \text{(Equation 6c)}$$

Using Equation 6c, the desired value for A2/A1 is calculated based on a value. As an example, for $\alpha$ value to be in the range of 2 to 5, the range of A2/A1 is between ⅓ to ⅔. As an another example, for $\alpha$ value to be in the range of 1.5 to 6, the range of A2/A1 is between 0.2 to 0.71.

As discussed above and further emphasized here, FIGS. 4a and FIG. 4b illustrate an exemplary embodiment of the invention, which should not unduly limit the scope of the claims. One of ordinary skill in the art would recognize many variations, alternatives, and modifications. For example, the driving signal source 430 may be an AC source with a fixed frequency or clock signals. In another example, the first attenuator 450 may be removed from the eDML system 400, which results in the first driving signal being provided to the modulator 420 without first being attenuated. Alternatively, the second attenuator 460 may be removed from the eDML system 400, which results in the second driving signal being provided to the modulator 420 without first being attenuated. An example of an eDML system 400 with one attenuator is shown on FIG. 4c.

Figure 4C:
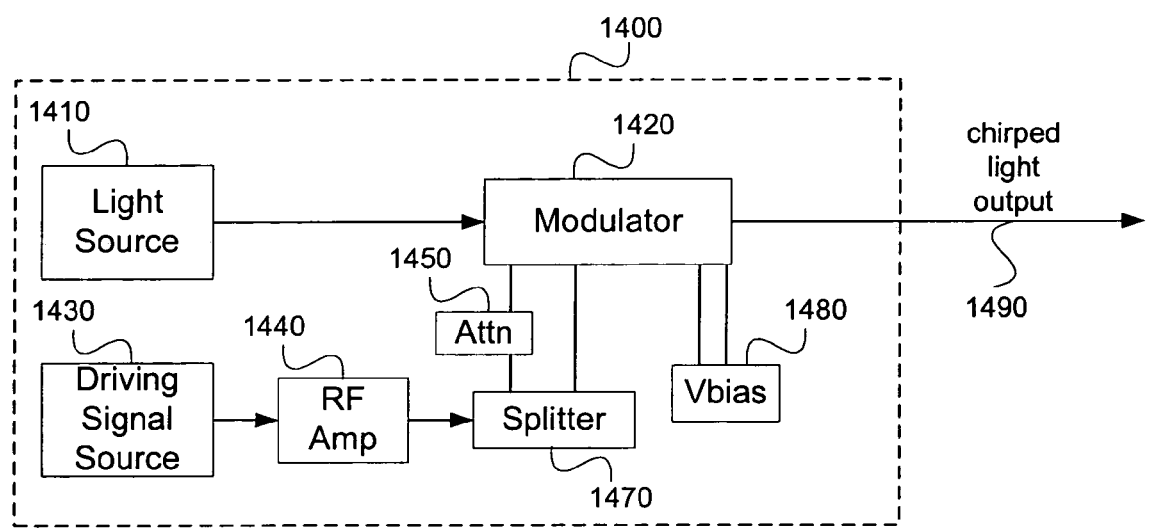
FIG. 4c is a simplified diagram illustrating an exemplary embodiment of the present invention for an eDML system for producing chirped light.

FIG. 4c is a simplified diagram illustrating an exemplary embodiment of the present invention for an eDML system for producing chirped light. This diagram is merely an example, which should not unduly limit the scope of the claims. One of ordinary skill in the art would recognize many variations, alternatives, and modifications. The eDML system 1400 includes a light source 1410, a modulator 1420, a driving signal source 1430, an RF amplifier 1440, an attenuator 1450, a splitter 1470, and a voltage source 1480. Although the above has been shown using a selected group of components for the eDML system 1400, there can be many alternatives, modifications, and variations. For example, some of the components may be expanded and/or combined. Other components may be inserted to those noted above. Depending upon the embodiment, the arrangement of components may be interchanged with others replaced. The eDML system 1400 is capable of producing chirped light output 1490 that, for example, may be used to transmit signals over an optical network. Further details of these apparatuses are found throughout the present specification and more particularly below.

As an example, the light source 1410 is CW laser. It is to be appreciated that the CW laser as utilized in the present embodiment of the invention may have a wide range of tunable wavelengths, which could have a tunable range greater than 30 nm. Merely by way of an example, the modulator 1420 receives light from the light source 1410, amplified and attenuated driving signals originated from the driving signal source 1430, and two bias voltages from the voltage source 1480. Generally, two voltages are different. As an example, two bias voltages have the same magnitude, but are opposite in their signs (one being positive, the other being negative). After modulating light with driving signals and the bias voltage, the modulator 1420 transmits the chirped light output 1490.

To provide light for the modulator 1420, the light source 1410 is used. As an example, CW laser is used to provide laser light for the modulator 1420. The voltage source 1480 is electrically coupled to the modulator 1420 to provide a bias voltage. Merely by way of an example, the voltage source is a direct current (DC) source that provides a constant DC voltage. As an example, the voltage source is a direct current source that provides two different constant DC voltages. Driving signals are provided by the driving signal source 1430. Merely by way of an example, driving signals produced by the driving signal source 1430 is sinusoidal signals with substantially the same frequency. The driving signal source 1430 provides driving signals to the RF amplifier 1440. The RF amplifier 1440 amplifies driving signals to a predetermined amplitude. After amplification, the RF amplifier 1440 provides driving signals to the splitter 1470, which splits driving signals into a first driving signal and a second driving signal. Merely by way of an example, the first driving signal and a second driving signal share substantially the same properties. For example, the first driving signal and the second driving signal have equal, frequency, and phase. Next, the attenuator 1450 receives and attenuates the first driving signal. As a result, the first attenuator 1450 modifies the first driving signal into a third driving signal, and the second driving signal stays the same, the second driving signal and the third driving signal being different. The second driving signal and the third driving signal are both provided to the modulator 1420 that uses the second driving signal and the third driving signal to modulate the light produced by the light source 1410. The modulator 1420 is substantial the same as the modulator 420 as shown in FIG. 4b.

Figure 5:
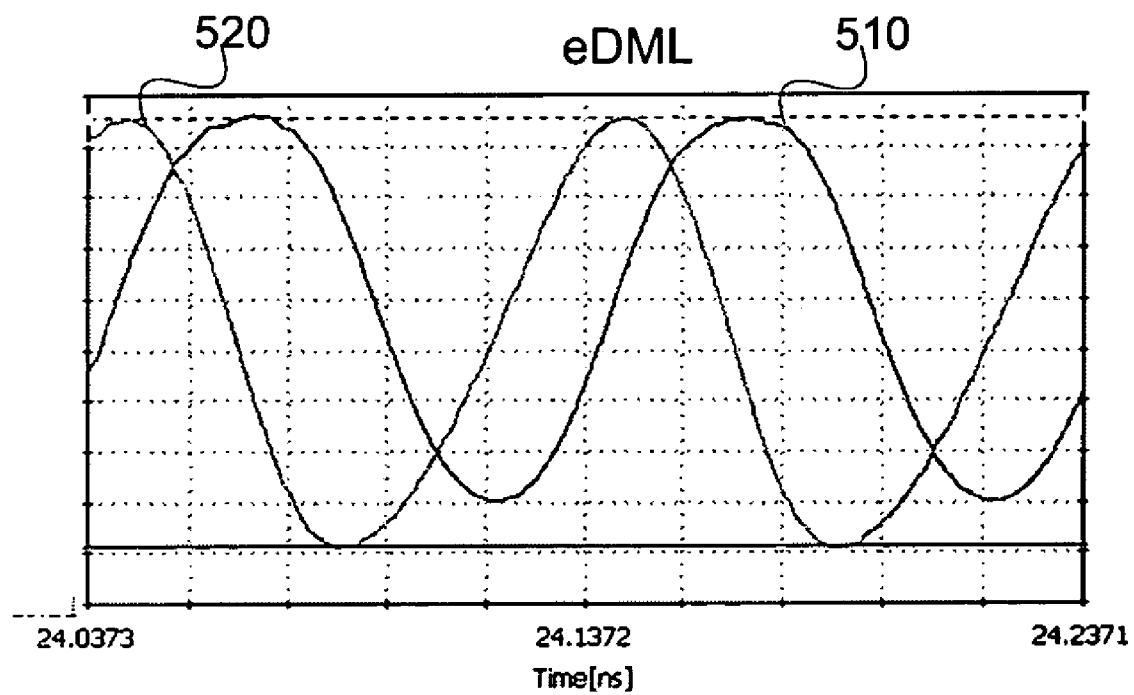
FIG. 5 illustrates an example of a chirped light waveform produced by an eDML system according to an embodiment of the present invention.

FIG. 5 illustrates an example of a chirped light waveform produced by an eDML system according to an embodiment of the present invention. This diagram is merely an example, which should not unduly limit the scope of the claims. One of ordinary skill in the art would recognize many variations, alternatives, and modifications. The eDML system 400 is an embodiment of the invention that is capable of producing the chirped light waveform as shown in FIG. 5. The third driving signal attenuated by the first attenuator 450 is a sinusoidal waveform with 4.48V peak to peak intensity. The fourth driving signal attenuated by the second attenuator 460 is a sinusoidal waveform with 6.32V peak to peak intensity. The third driving signal and the fourth signal share substantially the same frequency. The ratio of A2/A1 is this case is thus 4.48/6.32=0.71. Accordingly, the chirp factor $\alpha$ in this case, as calculated using Equation 6b is 5.9, a positive number. In general, a chirp factor with a positive value is desirable according to an embodiment, as the positive chirp factor helps compensate the negative dispersion generated due to SPM effects, which narrows pulses duration, in a long hull optical network. It is to be appreciated that according to the present embodiment of the invention, the system 400 is also capable of generating chirp factor with other values, including negative values.

Shown on FIG. 5 are the chirp profile 520 and the intensity profile 510. It is to be noted that the chirp profile 520, which is generated by the eDML system 400, closely mimics the chirp profile 220 that is generated by the DML system 100. It is also to be noted that the intensity profile 510, which is generated by the eDML system 400, closely mimics the intensity profile 210 that is generated by the DML system 100. It is to be appreciated that certain embodiments of the present invention provides a new way for generating chirped light.

Figure 6A:
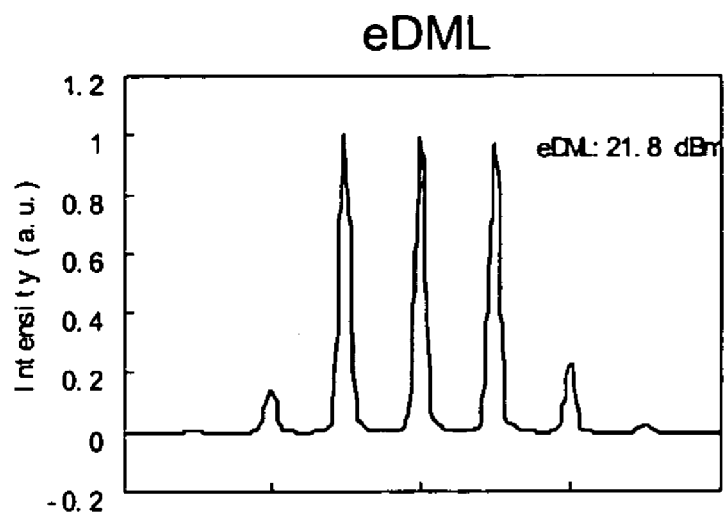
FIG. 6a illustrates a simplified chirped light output spectrum produced by an eDML system according to an embodiment of the present invention.

FIG. 6a illustrates a simplified chirped light output spectrum produced by an eDML system according to an embodiment of the present invention. The eDML system 400 is an example of an eDML system that is capable of producing the chirped light output spectrum of FIG. 6a. In the example, the driving signal source 430 of FIG. 4a provides a sinusoidal signal at 9.95 GHz to the RF amplifier 440. The RF amplifier 440 amplifies the sinusoidal driving signals to a driving power of 21.8 dBm, which is then attenuated by the first attenuator 450 and the second attenuator 460 and for the modulator 420. Under modulation, the modulator 420 provides a chirped light output 490. The chirped light output 490 exhibits the chirped light output frequency spectrum as shown on FIG. 6a.

Figure 6B:
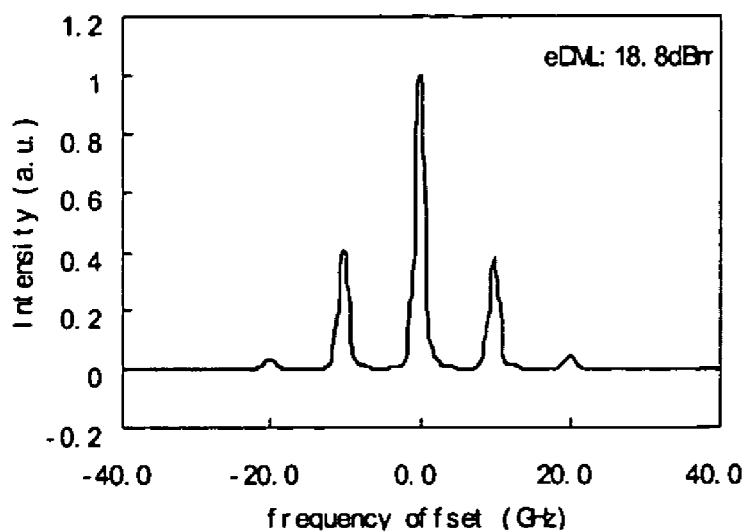
FIG. 6b illustrates another example of a simplified chirped light output spectrum produced by an eDML system according to another embodiment of the present invention.

FIG. 6b illustrates another example of a simplified chirped light output spectrum produced by an eDML system according to another embodiment of the present invention. The eDML system 400 is an example of an eDML system that is capable of producing the chirped light output spectrum of FIG. 6b. In the example, the driving signal source 430 of FIG. 4a provides a sinusoidal signal at 9.95 GHz to the RF amplifier 440. The RF amplifier 440 amplifies the sinusoidal driving signals to a driving power of 18.8 dBm, which is then attenuated by the first attenuator 450 and the second attenuator 460 and for the modulator 420. Under modulation, the modulator 420 provides a chirped light output 490. The chirped light output 150 exhibits the chirped light output frequency spectrum as shown on FIG. 6b.

Now referring back to FIG. 4b, where the light separator 425 is capable of separating light provided by the light source 410 into two light portions with unequal strength. In an exemplary situation where the light separator 425 separates light, which may be a CW laser, into two light portions with different strength, the chirped light output 490 produced by the eDML system 400 has different chirp characteristics from a chirped light output generated by two equal strength light portions. It is to be appreciated that the CW laser as utilized in the present embodiment of the invention may be a CW laser with widely tunable wavelength, which may have a tunable range greater than 30 nm. According to a preferred embodiment of the invention, the modulator 420 belongs to an InP-based or LN-based dual drive MZ modulator with a finite DC extinction ratio. In this example, the first path 421 and the second path 423 receive unequal strength light portions. When applied voltages are applied to the first electrode 422 and the second electrode 424, the modulator produces a chirped light output 490.

According to an embodiment of the present invention, the chirped light output 490 is expressed as the following.

$$E_{OUT}(t)=E_{IN}\{(1-S)\cdot\exp[-i\cdot V1(t)-i\cdot\phi_{diff}]+S\cdot\exp[-i\cdot V2(t)+i\cdot\phi_{diff}]\} \quad \text{(Equation 7)}$$

In Equation 7, the symbol "S" represents the splitting factor, which is a value between 0 and 1, for unequal splitting of light into two portions. The term V1(t) represents the driving signal being applied to the first electrode 422, and V1(t) may alternatively be expressed as V1(t)=η·A1·u(t). Similarly, the term V2(t) represents the driving signal being applied to the second electrode 424, and V2(t) may alternatively be expressed as V2(t)=η·A2·u(t). The symbol "η" represents the EO coefficient of the first electrode 422 and the second electrode 424. "A1" and "A2" are the attenuation factors respectively for the first attenuator 450 and the second attenuator 460. The symbol "u(t)" represents the driving signal unit temporal function. Thus, Equation 7 may alternatively be expressed as the following.

$$E_{OUT}(t)=E_{IN}\cdot\exp[-i\cdot\eta\cdot(A1-A2)/2\cdot u(t)]\cdot\{\cos[\eta\cdot(A1-A2)/2\cdot u(t)+\phi_{diff}]-i\cdot(1-2S)\cdot\sin[\eta\cdot(A1-A2)/2\cdot u(t)+\phi_{diff}]\} \quad \text{(Equation 7a)}$$

The optical intensity of the chirped light output 490 may be expressed as the following.

$$I_{OUT}(t)=I_{IN}\cdot\{\cos^2[\eta/2\cdot(A1-A2)\cdot u(t)+\phi_{diff}]+\epsilon^2\cdot\sin^2[\eta/2\cdot(A1-A2)\cdot u(t)+\phi_{diff}]\} \quad \text{(Equation 7c)}$$

The phase of the optical output 490 may be expressed as the following.

$$\phi=-\{\eta/2\cdot(A1+A2)\cdot u(t)+\arctan\{\epsilon\cdot\tan[\eta/2\cdot(A1-A2)\cdot u(t)+\phi_{diff}]\} \quad \text{(Equation 7c)}$$

In Equation 7c, the term "ϵ" is defined as ϵ=1−2S, which represents the partitioning factor for light portions that pass through the first path 421 and the second path 423. When the two light portion has the same strength, the term "ϵ" becomes zero (ϵ=1−2·S=1−2·0.5=1−1=0), the second term "arctan{ϵ·tan [η/2·(A1−A2)·u(t)+ϕ_{diff}]}" of Equation 7c becomes zero. Equation 7c, without the second term, is the same as Equation 5b.

Derived from Equation 7c, the following expression may be obtained.

$$\Delta\nu_{CHIRP}(t)=-\eta/4\pi\cdot u'(t)\cdot\{(A1+A2)+\epsilon\cdot(A1-A2)\cdot I_{IN}/I_{OUT}(t)\} \quad \text{(Equation 7d)}$$

In Equations 7d, the term "$I_{IN}/I_{OUT}$" denotes relative intensity. The relative intensity may alternatively be expressed as the following.

$$1/I(t)\cdot dI(t)/dt=-\eta\cdot(1-\epsilon^2)\cdot(A1-A2)\cdot u'(t)\cdot\{\tan[\eta/2\cdot(A1-A2)\cdot u(t)+\phi diff]\}/\{1+\epsilon^2\cdot\tan2[\eta/2\cdot(A1-A2)\cdot u(t)+\phi diff]\} \quad \text{(Equation 7e)}$$

The chirp form factor may be expressed as the following.

$$\alpha=\{[A1+(1-\epsilon)/(1+\epsilon)\cdot A2]\cdot\cotan[\eta/2\cdot(A1-A2)\cdot u(t)+\phi_{diff}]+\epsilon\cdot[A1-(1-\epsilon)/(1+\epsilon)\cdot A2]\cdot\tan[\eta/2\cdot(A1-A2)\cdot u(t)+\phi_{diff}]\}/[(1-\epsilon)\cdot(A1-A2)] \quad \text{(Equation 7f)}$$

When the two light portions have the same strength, the term "ϵ" becomes zero. Merely by way of an example, in a small signal modulation scheme where the η/2·(A1−A2)·u(t)≪1, the chirp form factor may be expressed the following.

$$\alpha_{ss}=\{[A1+(1-\epsilon)/(1+\epsilon)\cdot A2]\cdot\cotan(\phi_{diff})+\epsilon\cdot[A1-(1-\epsilon)/(1+\epsilon)\cdot A2]\cdot\tan(\phi_{diff})\}/[(1-\epsilon)\cdot(A1-A2)] \quad \text{(Equation 8)}$$

For the present embodiment of the invention, it is often desirable for the modulator 420 to be biased at quadrature. When the modulator 420 is biased at quadrature, the phase shift factor "$\phi_{diff}$" is equal to either π/4 or −π/4. When "$\phi_{diff}$" is equally to π/4, Equation 8 may be simplified to the following expression.

$$\alpha_{ss(\pi/4)}=[1+(1-\epsilon^2)\cdot A2/A1]/[[(1-\epsilon^2)\cdot(1-A2/A1)] \quad \text{(Equation 8a)}$$

Alternatively, when "$\phi_{diff}$" is equal to $-\pi/4$, Equation 8 may be simplified to the following expression.

$$\alpha_{ss(-\pi/4)} = -[1+(1-\epsilon^2)^2 \cdot A2/A1]/[[(1-\epsilon^2) \cdot (1-A2/A1)] \qquad \text{(Equation 8b)}$$

In both Equations 8a and Equation 8b, the term "$1-\epsilon^2$" is derived from $(1-\epsilon)/(1+\epsilon)=1-\epsilon^2$ in Equation 6a and Equation 6b respectively.

The modulation using light portions with equal strength is a case that the term "$\epsilon$" is equal to zero. In cases where the difference between two light portions is negligibly small, where $\epsilon \ll 1$, Equation 8a and Equation 8b are substantially the same as Equation 6a and Equation 6b. Therefore, Equations 6a and Equation 6b may be used to make approximation according to an embodiment of the present invention. Merely by way of an example, the term "$\epsilon$" may be applied to Equations 5a through 5f as a modification factor for the values of A1, A2, and (A1−A2).

According to certain embodiments of the present invention, it is to be appreciated that the eDML system 400 with the light separated into two portions at unequal strength at the modulator 420 is capable of producing chirped light output that is substantially the same as chirped light output produced by a DML system. It is also to be appreciated that the chirped light eDML system 400 offers additional variables, such as the partitioning factor, for adjusting the characteristics of chirped light output.

Figure 7:
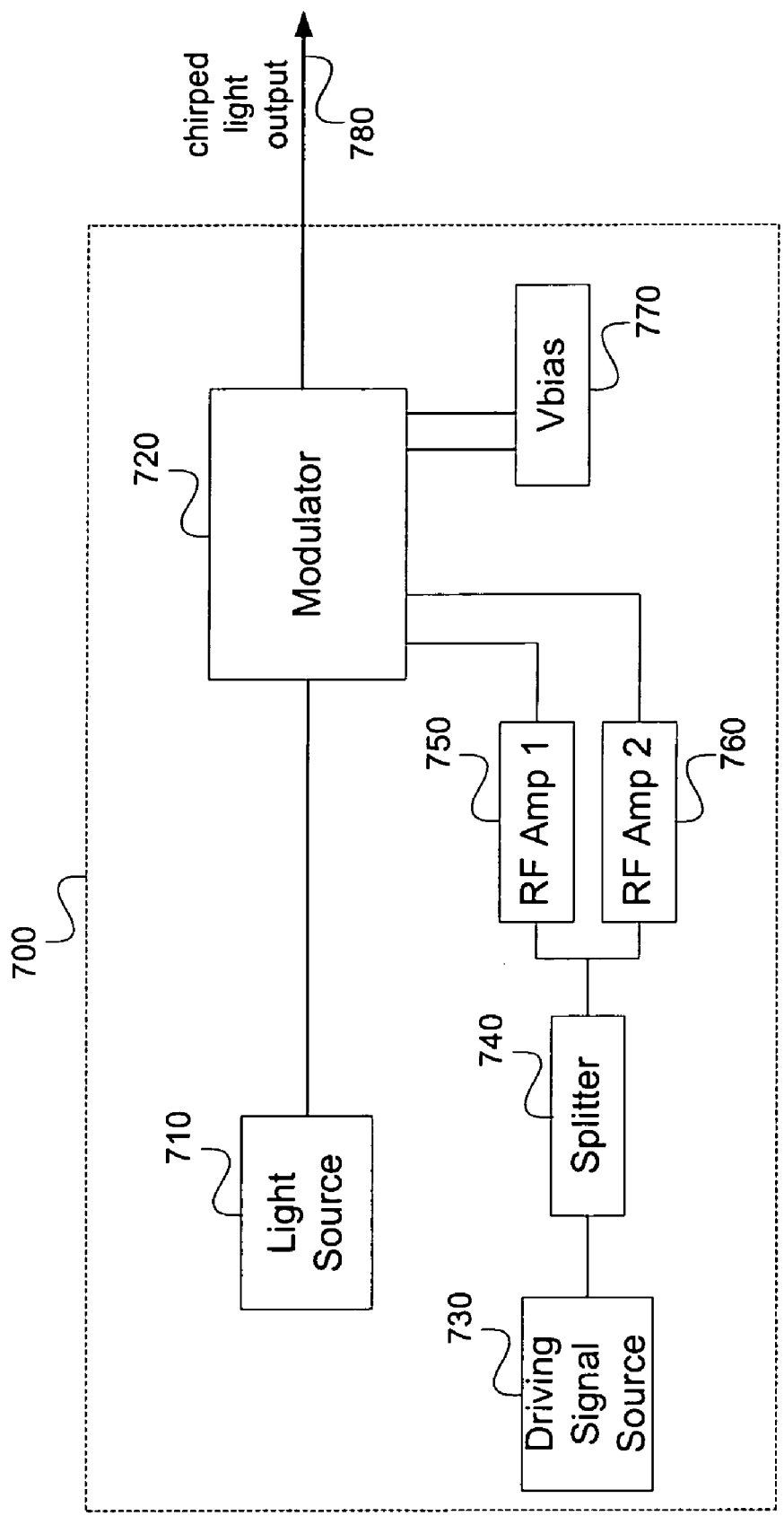
FIG. 7 is a simplified diagram for an alternative exemplary embodiment of an eDML system that produces chirped light.

FIG. 7 is a simplified diagram for an alternative exemplary embodiment of an eDML system for producing chirped light. This diagram is merely an example, which should not unduly limit the scope of the claims. One of ordinary skill in the art would recognize many variations, alternatives, and modifications. The eDML system 700 comprises a light source 710, a modulator 720, a driving signal source 730, a splitter 740, a first RF amplifier 750, a second RF amplifier 760, and a voltage source 770. The eDML system 700 is capable of producing chirped light output 780 that may be used to transmit signals over an optical network. Merely by way of an example, the modulator 720 receives light from the light source 710, amplified driving signals originated from the driving signal source 730, and a bias voltage from the voltage source 770. After modulation, the modulator 720 transmits the chirped light output 780.

To provide light for the modulator 720, the light source 710 may be used. As an example, CW laser is used to provide laser light for the modulator 720. It is to be appreciated that the CW laser as utilized in the present embodiment of the invention is a CW laser with widely tunable wavelength, which has a tunable range greater than 30 nm. The voltage source 770 is coupled to the modulator 720 to provide bias voltages. Merely by way of an example, the voltage source is a DC source that provides a constant DC voltage. Driving signals are provided by the driving signal source 730. Merely by way of an example, driving signals produced by the driving signal source 730 may be sinusoidal signals with substantially the same frequency. The driving signal source 730 provides the driving signal to the splitter 740, which splits the driving signal into a first driving signal and a second driving signal. The first amplifier 750 amplifies the first driving signal. The second amplifier 760 amplifies the second driving signal. In general, the first amplifier 750 and the second amplifier 760 have different amplification factors, and the amplification factors may be maintained at a fixed ratio. As a result, the first driving signal and the second driving signal usually have different strength. Mere by way of an example, the first driving signal and the second signal may share substantially the same wavelength, frequency, and phase, but have different amplitude. The modulator 720 uses both the first driving signal and the second driving signal to produced a chirped light output 780. The modulator 720 operates in substantially the same manner as the modulator 420.

Figure 8:
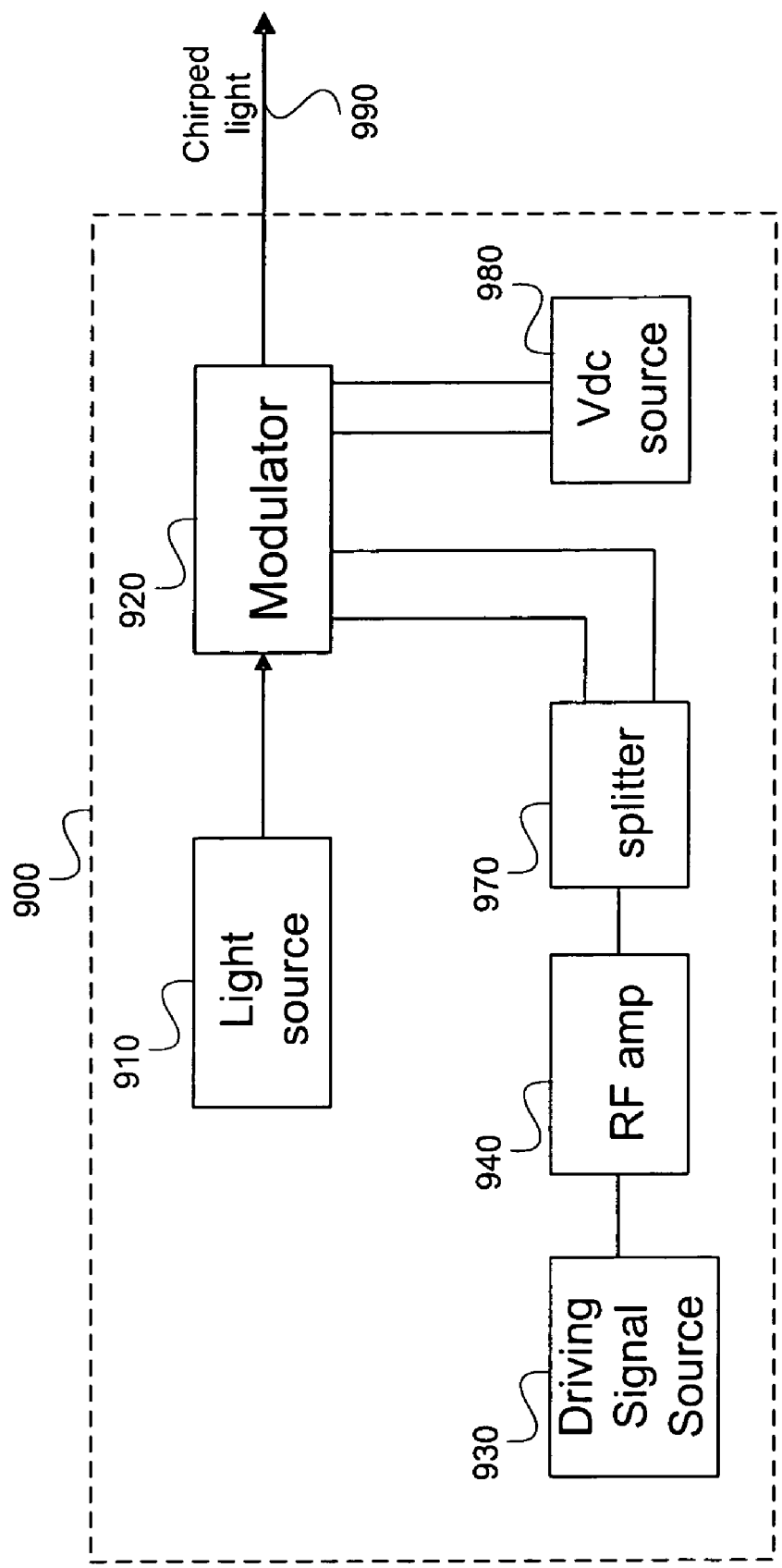
FIG. 8 is a simplified diagram illustrating an alternative embodiment of the present invention for an emulated directly modulated lasers (eDML) system for producing chirped light.

FIG. 8 is a simplified diagram illustrating an alternative embodiment of the present invention for an emulated directly modulated lasers (eDML) system for producing chirped light. This diagram is merely an example, which should not unduly limit the scope of the claims. One of ordinary skill in the art would recognize many variations, alternatives, and modifications. The eDML system 900 includes a light source 910, a modulator 920, a driving signal source 930, an RF amplifier 940, a splitter 970, and a voltage source 980. Although the above has been shown using a selected group of components for the eDML system 900, there can be many alternatives, modifications, and variations. For example, some of the components may be expanded and/or combined. Other components may be inserted to those noted above. Depending upon the embodiment, the arrangement of components may be interchanged with others replaced. The eDML system 900 is capable of producing chirped light output 990 that, for example, may be used to transmit signals over an optical network. Further details of these apparatuses are found throughout the present specification and more particularly below.

As an example, the light source 910 is continuous wave (CW) laser. It is to be appreciated that the CW laser as utilized in the present embodiment of the invention has a wide range of tunable wavelengths, which could have a tunable range greater than 30 nm. Merely by way of an example, the modulator 920 receives light from the light source 910, amplified and attenuated driving signals originated from the driving signal source 930, and two bias voltages from the voltage source 980. Generally, two bias voltages are different. As an example, two bias voltages have the same magnitude, but are opposite in their signs (one being positive, the other being negative). As another example, one of bias voltage is biased at a non-zero DC voltage, and the other bias voltage is biased at zero voltage (or ground). After modulating light with driving signals and the bias voltage, the modulator 920 transmits the chirped light output 990. According to an embodiment, the modulator 920 is substantially the same as the modulator 420 according to FIG. 4b.

To provide light for the modulator 920, the light source 910 is used. As an example, a CW laser is used to provide laser light for the modulator 920. The voltage source 980 is electrically coupled to the modulator 920 to provide a bias voltage. Merely by way of an example, the voltage source 980 is a DC source that provides a constant DC voltage. According to an embodiment, the voltage source is a direct current source that provides two different constant DC voltages. According to an alternative embodiment, the voltage source 980 is a DC source that provides two constant DC voltages that have the same magnitude but have opposite signs. Driving signals are provided by the driving signal source 930. Merely by way of an example, driving signals produced by the driving signal source 930 is sinusoidal signals with substantially the same frequency. The driving signal source 930 provides driving signals to the RF amplifier 940. The RF amplifier 940 amplifies driving signals to a predetermined amplitude. After amplification, the RF amplifier 940 provides driving signals to the splitter 970, which splits driving signals into a first driving signal and a second driving signal. According to an embodiment, the splitter 970 is capable of splitting the driving signals at a predetermined splitting ratio. The magnitude ratio between the first driving signal and the second driving signal has a range of 0.2 to 0.71. According to another example, the magnitude ratio between the first driving signal and the second driving signal has a range of 1/3 to 2/3. The first driving signal and the second driving signal are both provided to the modulator 920 that uses the third driving signal and the fourth driving signal to modulate the light produced by the light source 910. According to an embodiment, the chirp factor of the chirped light output 990 has a range of value between 1.5 to 6, which is similar to the chirp factor of a DML system. According to an another embodiment, the chirp factor of the chirped light output 990 has a range of value between 2 to 5, which is similar to the chirp factor of a DML system.

Figure 9:
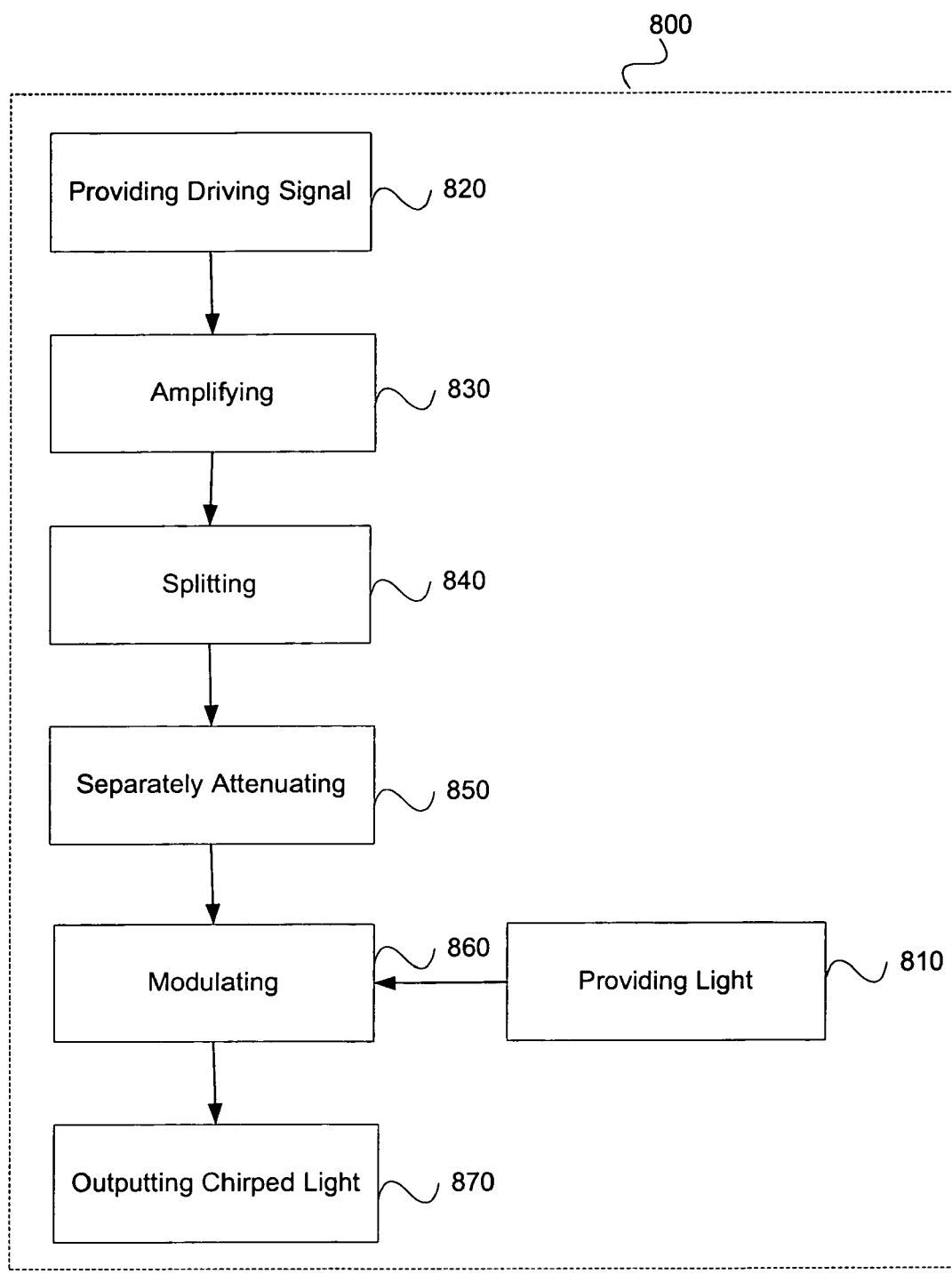
FIG. 9 is a simplified method for producing chirped light according to an embodiment of the present invention.

FIG. 9 is a simplified method for producing chirped light according to an embodiment of the present invention. This diagram is merely an example, which should not unduly limit the scope of the claims. One of ordinary skill in the art would recognize many variations, alternatives, and modifications. The method 800 for producing chirped light comprises process 810 for providing light, process 820 for providing driving signal, process 830 for amplifying driving signal, process 840 for splitting driving signal, process 850 for separately attenuating split driving signals, process 860 for modulating light using split driving signals, and process 870 for producing chirped light output. As an example, the eDML system 400 as shown in FIGS. 4a and 4b is used to perform the method 800. Although the above has been shown using a selected sequence of process, there can be many alternatives, modifications, and variations. For example, some of the process may be expanded and/or combined. Other process may be inserted to those noted above. Depending upon the embodiment, the specific sequences of steps may be interchanged with other replaced. Further details of these processes are found throughout the present specification and more particularly below.

At process 820, a driving signal is provided. As an example, the driving signal is a sinusoidal signal with a predetermined frequency provided by the driving signal source 410. At process 830, the driving signal is amplified. For example, the driving signal is amplified by the RF amplifier 440. At process 840, the driving signal is split into a first driving signal and a second driving signal. For example, the splitter 470 splits the driving signal into the first driving signal and the second driving signal, the first and second driving signals being substantially the same. At process 850, the first driving signal and the second driving signal are separately attenuated at different attenuation levels. As an example, the first driving signal is attenuated by the first attenuator 460 and the second driving signal is attenuated by the second attenuator 470, the first and the second attenuators having different attenuation factor. After attenuation, the first driving signal becomes the third driving signal and the second driving signal becomes the fourth driving signal, the third and fourth driving signals being different. At the process 810, a light is provided. For example, the light source 410 provides a light. For example, the light source 410 is a CW laser with wide tunable wavelength that provides a laser. At process 860, the light first separated into two portions and then modulated by the modulator using at least the third and the fourth driving signals. For example, the modulator 420 applies the third driving signal on the first electrode 422 and the fourth driving signal on the second electrode 424 to obtained both frequency and amplitude modulation for the light. At process 870, a chirped light output is produced by the modulator. As an example, the waveguide 427 of the modulator 420 combines the two modulated light portion and provides a chirped light output 490. According to an embodiment, the ratio for attenuation (between the first attenuator 460 and the second attenuator 470) is between 1/3 to 2/3, and the chirp factor of the chirped light output 490 has a range of value between 2 to 5, which is similar to the chirp factor of a DML system. According to another embodiment, the ratio for attenuation (between the first attenuator 460 and the second attenuator 470) is between 0.2 to 0.71, and the chirp factor of the chirped light output 490 has a range of value between 1.5 to 6.

As discussed above and further emphasized here, FIG. 9 merely provides an example, which should not unduly limit the scope of the claims. One of ordinary skill in the art would recognize many variations, alternatives, and modifications. For example, at process 850, the driving signal source 430 may be an AC source with a fixed frequency or clock signals. In another example, at process 850 only one of the driving signals is being attenuated. In yet another example, the process 850 is skipped.

The present invention has various advantages. In long haul optical transport systems, such as an LH/ULH DWDM transport systems, it is often desirable to be able to use chirped light in transmission. A conventional DML system provides a way for generating chirped light with certain desired chirp characteristics. However, conventional DML systems generally have a narrow range of tunable wavelength. Often, the tunable range is limited to less than 3 nm. According to certain embodiments of the present invention, a much wider tunable range is obtained. For example, using a CW laser as light source, an eDML system according the present invention may have a tuner range wider than 30 nm.

Additionally, some embodiments of the present invention are more cost effective than a conventional DML system. For example, an exemplary eDML system, utilizing integrated InP MZ modulator with WDM lasers, may replace a DML system in some transponders. Because the integrated InP MZ modulator with WDM lasers are equipped with internal wavelength lockers, the eDML system can be highly cost-effective for a 50 G spacing implementation of transponders.

Although specific embodiment of the present invention have been described, it will be understood by those of skill in the art that there are other embodiments that are equivalent to the described embodiments. Accordingly, it is to be understood that the invention is not to be limited by the specific illustrated embodiments, but only by the scope of the apprehended claims.

What is claimed is:

1. A system for providing chirped light for an optical network, the system comprising:
   a light source configured to provide a light;
   a driving signal source configured to provide a first driving signal, wherein the first driving signal does not include information associated with data;
   an amplifier configured to receive the first driving signal, amplify the first driving signal, and provide a second driving signal at a predetermined amplification level, the second driving signal being the amplified first signal;
   a splitter configured to receive the second driving signal and split the second driving signal into a third driving signal and a fourth driving signal;
   a first attenuator configured to receive the third driving signal, attenuate the third driving signal at a first attenuation level, and provide a fifth driving signal, the fifth driving signal being the third driving signal attenuated by the first attenuator;
   a second attenuator configured to receive the fourth driving signal, attenuate the fourth driving signal at a second attenuation level, and provide a sixth driving signal, the sixth driving signal being the fourth driving signal attenuated by the second attenuator;
   a voltage source configured to provide a first bias voltage and a second bias voltage;
   a modulator configured to receive the light, modulate the light using a first applied voltage and a second applied voltage, and provide a chirped light output;

wherein the first attenuation level is different from the second attenuation level;

wherein the fifth driving signal is different from the sixth driving signal;

wherein the first applied voltage includes the fifth driving signal and the first bias voltage;

wherein the second applied voltage includes the sixth driving signal and the second bias voltage.

2. The system of claim 1 wherein the chirped light output is associated with a chirp factor, the chirp factor having a range of 2 to 6.

3. The system of claim 1 wherein the first driving signal is a clock signal.

4. The system of claim 1 wherein the first driving signal is substantially single frequency and substantially single peak-to-peak amplitude.

5. The system of claim 1 wherein the third driving signal is associated with a first plurality of characteristics, the fourth driving signal is associated with a second plurality of characteristics, the first plurality of characteristics and the second plurality of characteristics being substantially the same.

6. The system of claim 1 wherein the first bias voltage is associated with a first plurality of characteristics, the second bias voltage is associated with a second plurality of characteristics, the first plurality of characteristics and the second plurality of characteristics being substantially the same.

7. The system of claim 1 wherein the first bias voltage is associated with a first plurality of characteristics, the second bias voltage is associated with a second plurality of characteristics, the first plurality of characteristics and the second plurality of characteristics being different.

8. The system of claim 1 wherein the first bias voltage and the second bias voltage are DC voltages.

9. The system of claim 1 wherein the modulator is a Mach-Zehnder modulator.

10. The system of claim 1 wherein the modulator is associated with a phase shift factor equal to pi/4.

11. The system of claim 1 wherein the modulator is associated with a phase shift factor equal to −pi/4.

12. The system of claim 1 wherein the modulator is biased at quadrature.

13. The system of claim 1 wherein the modulator comprises:
    a light splitter configured to split the light into a first light portion and a second light portion;
    a first path configured to guide the first light portion, the first path being associated with a first electrode, the first electrode modulating the first light portion using the first applied voltage;
    a second path configured to guide the second light portion, the second path being associated with a second electrode, the second electrode modulating the second light portion using the second applied voltage;
    a light combiner configured to combine the first light portion and the second light portion to provide the chirped light output.

14. The system of claim 1 wherein the light source is a continuous wave laser.

15. A method for providing chirped light for an optical network, the method comprising:
    providing a light;
    providing a first driving signal, wherein the first driving signal does not include information associated with data;
    amplifying the first driving signal at a predetermined amplification level;
    splitting the amplified first driving signal into a second driving signal and a third driving signal;
    attenuating the second driving signal at a first attenuation level;
    attenuating the third driving signal at a second attenuation level;
    coupling the attenuated second driving signal to a first bias voltage to generate a first applied voltage;
    coupling the attenuated third driving signal to a second bias voltage to generate a second applied voltage;
    modulating the light using the first applied voltage and the second applied voltage;
    providing a chirped light output, the chirped light output being associated with the modulated light;
    wherein:
        the first attenuation level is different from the second attenuation level;
        the attenuated second signal is different from the attenuated third signal.

16. The method of claim 15 wherein the chirped light output is associated with a chirp factor, the chirp factor having a range of 2 to 6.

17. The method of claim 15 wherein the second driving signal is associated with a first plurality of characteristics, the third driving signal is associated with a second plurality of characteristics, the first plurality of characteristics and the second plurality of characteristics being substantially the same.

18. The method of claim 15 wherein the second signal is associated with a first plurality of characteristics, the third signal is associated a second plurality of characteristics, the first plurality of characteristics and the second plurality of characteristics being different.

19. The method of claim 15 wherein the first bias voltage is associated with a first plurality of characteristics, the second bias voltage is associated with a second plurality of characteristics, the first plurality of characteristics and the second plurality of characteristics being different.

20. The method of claim 15 wherein the first bias voltage is associated with a first plurality of characteristics, the second bias voltage is associated with a second plurality of characteristics, the first plurality of characteristics and the second plurality of characteristics being substantially the same.

21. The method of claim 15 wherein the modulating the light using the first applied voltage and the second applied voltage is associated with a bias at quadrature.

22. The method of claim 15 wherein the modulating the light using the first applied voltage and the second applied voltage comprises:
    separating the light into a second light portion and a third light portion;
    providing the second light portion to a first path;
    providing the third light portion to a second path;
    applying the first applied voltages to a first electrode associated with the first path and providing a fourth light portion, the fourth light portion being the second light portion associated with a first electro-optical effect caused by applying the first voltage to the first electrode;
    applying the second applied voltage to a second electrode associated with the second path; providing a fifth light portion, the fifth light portion being the third light portion associated with a second electro-optical effect caused by applying the second voltage to the second electrode;
    combining the fourth light portion and a fifth light portion; and
    providing the modulated light.

* * * * *